(12) United States Patent
Borchers et al.

(10) Patent No.: US 7,453,603 B2
(45) Date of Patent: Nov. 18, 2008

(54) CONTEXT-BASED ADAPTIVE IMAGE PROCESSING

(75) Inventors: Gregory E. Borchers, Vancouver, WA (US); James E. Owen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 11/688,750

(22) Filed: Mar. 20, 2007

(65) Prior Publication Data

US 2007/0171451 A1 Jul. 26, 2007

Related U.S. Application Data

(63) Continuation of application No. 10/113,816, filed on Mar. 29, 2002, now Pat. No. 7,212,314.

(51) Int. Cl.
*H04N 1/387* (2006.01)
*H04N 1/56* (2006.01)
(52) U.S. Cl. .................... 358/2.1; 358/3.24; 358/538
(58) Field of Classification Search ............ 358/1.9, 358/2.1, 3.24, 538, 530, 462, 1.13; 382/164, 382/173, 176; 385/1.13; 715/273, 276
See application file for complete search history.

(56) References Cited

U.S. PATENT DOCUMENTS

| | | | |
|---|---|---|---|
| 5,014,124 A | 5/1991 | Fujisawa |
| 5,331,442 A | 7/1994 | Sorimachi |
| 5,576,849 A | 11/1996 | Murakami et al. |
| 5,579,446 A | 11/1996 | Naik et al. |
| 5,704,021 A | 12/1997 | Smith et al. |
| 5,731,823 A | 3/1998 | Miller et al. |
| 5,861,960 A | 1/1999 | Suzuki et al. |
| 5,911,004 A | 6/1999 | Ohuchi et al. |
| 6,040,927 A | 3/2000 | Winter et al. |
| 6,256,104 B1 | 7/2001 | Rumph et al. |
| 6,744,918 B1 | 6/2004 | Caldato et al. |
| 6,900,902 B1 | 5/2005 | Tanaka |
| 6,941,014 B2 | 9/2005 | Lin et al. |
| 7,009,735 B2 | 3/2006 | Ebner |
| 7,218,405 B1 | 5/2007 | Aschenbrenner et al. |
| 2001/0030769 A1 | 10/2001 | Jacobs |

*Primary Examiner*—Scott A Rogers
(74) *Attorney, Agent, or Firm*—Madson & Austin

(57) ABSTRACT

A method for context-based processing of print data is provided. The method includes partitioning a document to be printed into a plurality of regions of interest. The method also includes determining context data for a first region of interest of the plurality of regions of interest. The context data may include information about how first print data corresponding to the first region of interest should be processed. The method also includes using the context data to process the first print data.

9 Claims, 11 Drawing Sheets

CONTEXT-BASED ADAPTIVE IMAGE PROCESSING

CROSS-REFERENCE TO RELATED APPLICATION

This application is a continuation of U.S. patent application Ser. No. 10/113,816, filed Mar. 29, 2002, and now issued as U.S. Patent No. 7,212,314.

TECHNICAL FIELD

This invention relates generally to computer software for printing, and is more particularly directed toward methods and apparatus for context-based processing of print data.

BACKGROUND

Typically, processing of a document to be printed occurs within a printer driver. The printer driver is a piece of software that enables a software application to communicate with a printer. When the application needs to print a document, it sends print data to the printer driver. Typically, the print data is a series of commands (e.g., draw a circle, draw a line of text in a particular font, etc.). The printer driver accepts the print data from the software application and then creates printer ready data. The printer ready data is print data translated into a format that the printer can understand. The format of the printer ready data may depend on the capabilities of the printer. For example, the printer ready data may be a series of commands. Alternatively, the printer ready data may be pixel data, i.e., data that may be used to print pixels on a piece of paper (e.g., RGB values, CMYK values, etc.).

Ideally, printer drivers are configured to process documents to be printed so as to balance the competing requirements of throughput, typically measured in pages per minute, and the print quality of the hardcopy output. However, the best way to balance these two competing requirements often varies for different types of documents. For example, documents with only black-and-white objects (e.g., plain text, black-and-white pictures, line art, etc.) are typically processed differently than documents with color objects (e.g., color text, pictures, line art, etc.).

Many computer applications allow different types of objects to be combined into one document. For example, a word processing document may contain images imported from a digital camera, charts and graphs taken from a spreadsheet, drawings imported from a drawing program, etc. Some of these objects may be in black-and-white, while others may be in color. Thus, both black-and-white objects and color objects are often combined into a single document.

It is difficult to process such documents so as to maintain the proper balance between throughput and print quality. One way to process a document having both black-and-white objects and color objects involves using one predetermined processing algorithm for each object within the document. Unfortunately, this approach typically results in printed documents that vary substantially in quality. Another way to process a document having both black-and-white objects and color objects involves using a best-fit algorithm for each type of object incorporated into the document. However, such an approach typically requires substantial processing time. Thus, benefits may be realized by a printer driver that is capable of context-based processing of print data.

SUMMARY OF THE INVENTION

A method for context-based processing of print data is provided. The method includes partitioning a document to be printed into one or more regions of interest. The method also includes determining context data for a first region of interest of the one or more regions of interest. The context data may include information about how first print data corresponding to the first region of interest should be processed. The method also includes using the context data to process the first print data.

In one embodiment, determining context data for the first region of interest includes determining whether the first print data includes black-and-white pixels, and determining whether the first print data includes color pixels. In such an embodiment, using the context data to process the first print data may include processing the first print data in a first way if the first print data only includes black-and-white pixels, processing the first print data in a second way if the first print data only includes color pixels, and processing the first print data in a third way if the first print data includes both color pixels and black-and-white pixels. In one embodiment, processing the first print data in a third way may include accessing a context map of the first print data. The context map may include color information about each pixel within the first print data.

The method may also include accessing user print settings for the document to be printed. Additionally, the method may include using the user print settings along with the context data to process the first print data.

A printer driver for context-based processing of print data is also provided. The printer driver includes a page assembler module configured to partition a document to be printed into a plurality of regions of interest, and to determine context data for each region of interest. The context data for a specific region of interest may include information about how print data corresponding to the specific region of interest should be processed. The printer driver also includes a processing unit configured to use the context data to process the print data to effect printing of the document.

In one embodiment, the page assembler module is further configured to determine whether first print data corresponding to a first region of interest includes a black-and-white pixel and/or a color pixel. In such an embodiment, the processing unit may include a black-and-white processing module configured to process black-and-white pixels, and a color processing module configured to process color pixels. The processing unit may be further configured to send the first print data to the black-and-white processing module if the first print data only includes black-and-white pixels, to send the first print data to the color processing module if the first print data only includes color pixels, and to send a first portion of the first print data to the black-and-white processing module and a second portion of the first print data to the color processing module if the first print data includes at least one color pixel and at least one black-and-white pixel.

In one embodiment, the page assembler module is further configured to access user print settings for the document to be printed. The processing unit may be further configured to use the user print settings along with the context data to process the print data to effect printing of the document.

A system for context-based processing of print data is also provided. The system may include a computer connected to a printer. The system may also include a document stored on the computer, the document having been generated by a software application running on the computer. The system may also include a printer driver stored on the computer. The printer driver may be configured as described previously.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

It will be readily understood that the components of the embodiments as generally described and illustrated in the Figures herein could be arranged and designed in a wide variety of different configurations. Thus, the following more detailed description of the embodiments of the methods and apparatus of the present invention, as represented in the Figures, is not intended to limit the scope of the invention, as claimed, but is merely representative of the embodiments of the invention.

Figure 1:
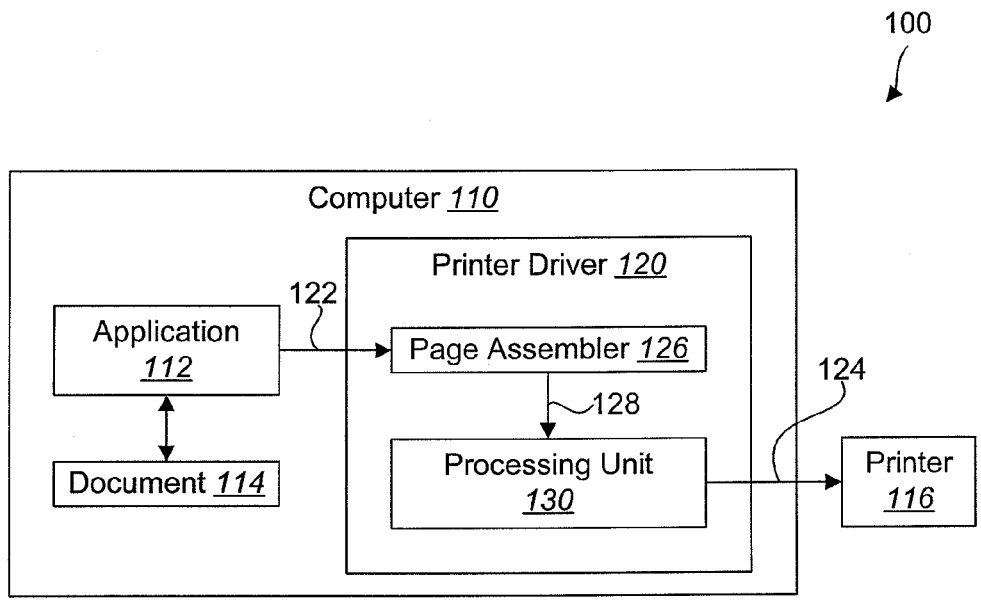
FIG. 1 is a block diagram of an embodiment of a system for context-based processing of print data.

FIG. 1 is a block diagram of an embodiment of a system 100 for context-based processing of print data. The system 100 includes a computer 110. The computer 110 may be any type of computing device, including a personal computer, workstation, personal digital assistant, etc. The computer 110 typically includes an operating system (not shown). The computer 110 may have one or more applications 112 running. Examples of applications 112 include word processors, spreadsheets, communication software, presentation software, etc. Typically, a user of the computer 110 uses an application 112 to generate one or more documents 114.

The computer 110 may be connected to a printer 116. The printer 116 may be any type of printing device that is capable of printing and that can be used in combination with the computer 110. Many such printers 116 are commercially available. The printer 116 may be used to print one or more documents 114 created by the application 112.

The printer driver 120 is software that enables the application 112 to communicate with the printer 116. When the application 112 needs to print a document, it sends print commands 122 (e.g., draw a circle, draw a line of text in a particular font, etc.) to the printer driver 120. The printer driver 120 accepts the print commands 122 from the application 112 and then creates printer ready data 124. In one embodiment, the printer ready data 124 is pixel data, such as CMYK pixel data.

The embodiment of the printer driver 120 shown in FIG. 1 includes two modules that facilitate the conversion of print commands 122 into printer ready data 124. First, the printer driver 120 includes a page assembler 126. The page assembler 126 receives the print commands 122 from the application 112 and creates partitioned print data 128. The partitioned print data 128 includes a plurality of data structures that include print data corresponding to regions of interest (ROIs) within the document 114. The print data may be pixel data, such as RGB pixel data. An ROI is any part of the document 114 that is useful for processing. An ROI may take the form of a page, a band (i.e., a rectangular section within a page), a horizontal raster, a pixel, or the like. The data structure generated by the page assembler 126 for an ROI also includes context data about the ROI. The context data may include information about how the print data corresponding to a particular ROI should be processed.

The partitioned print data 128 generated by the page assembler 126 is sent to the processing unit 130. The processing unit 130 uses the context data generated by the page assembler 126 to process the data structures corresponding to the ROIs within the document 114.

Figure 2:
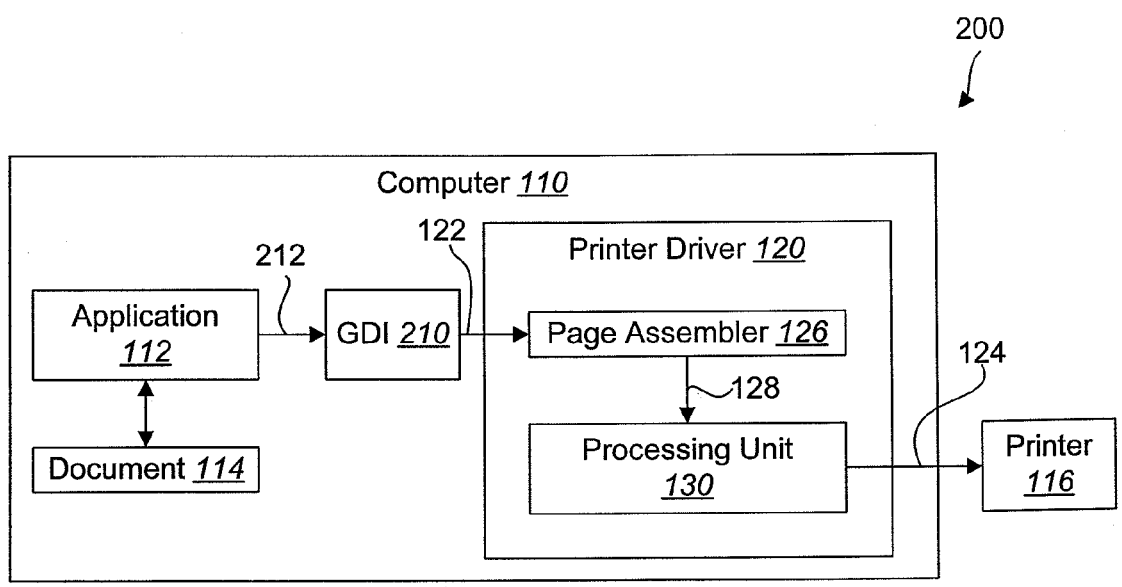
FIG. 2 is a block diagram illustrating an alternative embodiment of a system for context-based processing of print data.

FIG. 2 is a block diagram illustrating an alternative embodiment of a system 200 for context-based processing of print data. The system 200 includes a graphical device interface 210 (GDI) between the application 112 and the printer driver 120. The GDI 210 allows the application 112 to communicate with the printer driver 120 without knowing specific information about the printer driver 120. This allows the application 112 to create generic print commands 212. For example, to begin printing a document 114 the application 112 may send a series of commands that can be understood by the GDI 210, but not necessarily by the printer driver 120. The GDI 210 then converts the generic print commands 212 into print commands 122 that the printer driver 120 can understand.

Figure 3:
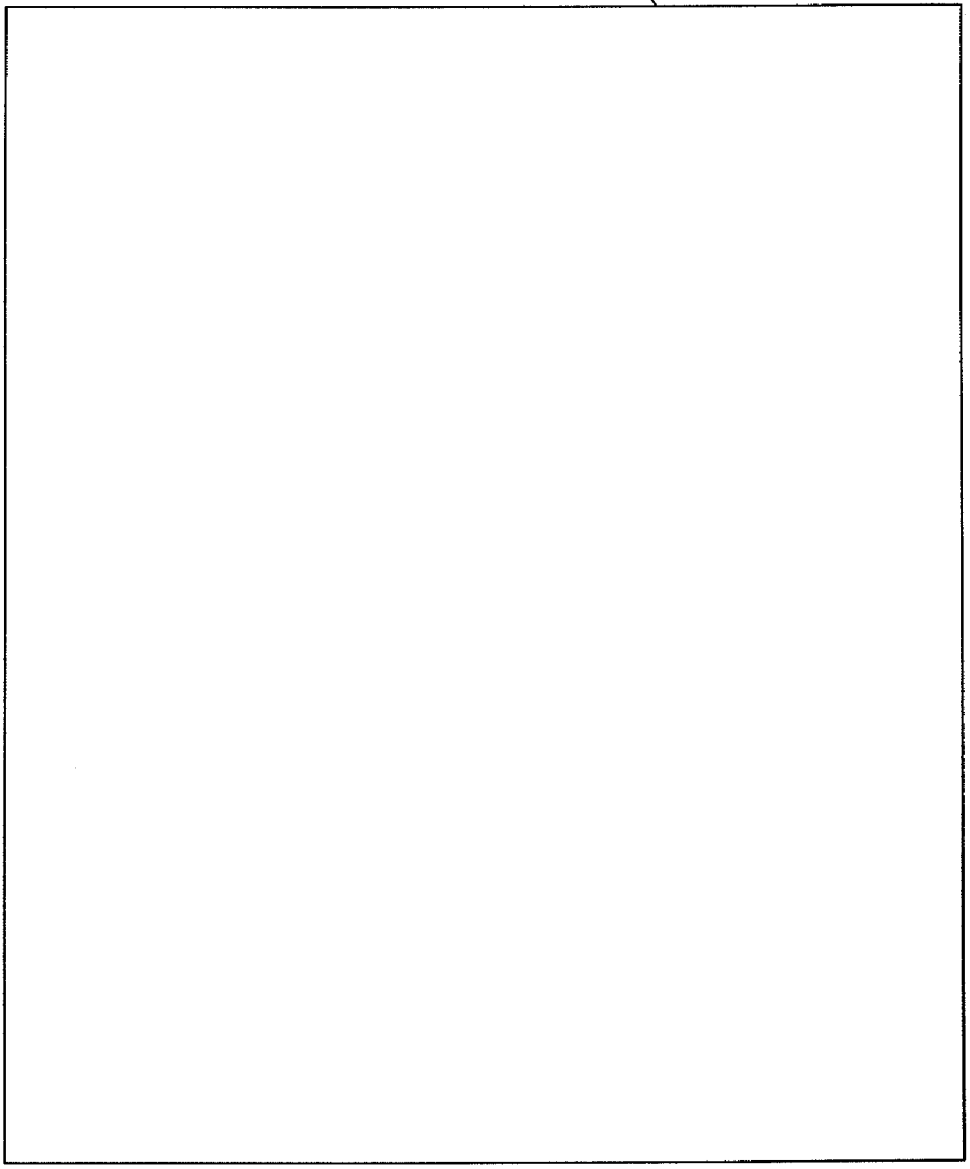
FIG. 3 is a diagram illustrating a document that may be printed by the printer.

FIG. 3 is a diagram illustrating a document 114 that may be printed by the printer 116. The document 114 may be any document 114 generated by the application 112, such as a word processing document, a spreadsheet document, a web page displayed by a web browser, an image generated by photo manipulation software, etc.

Figure 4:
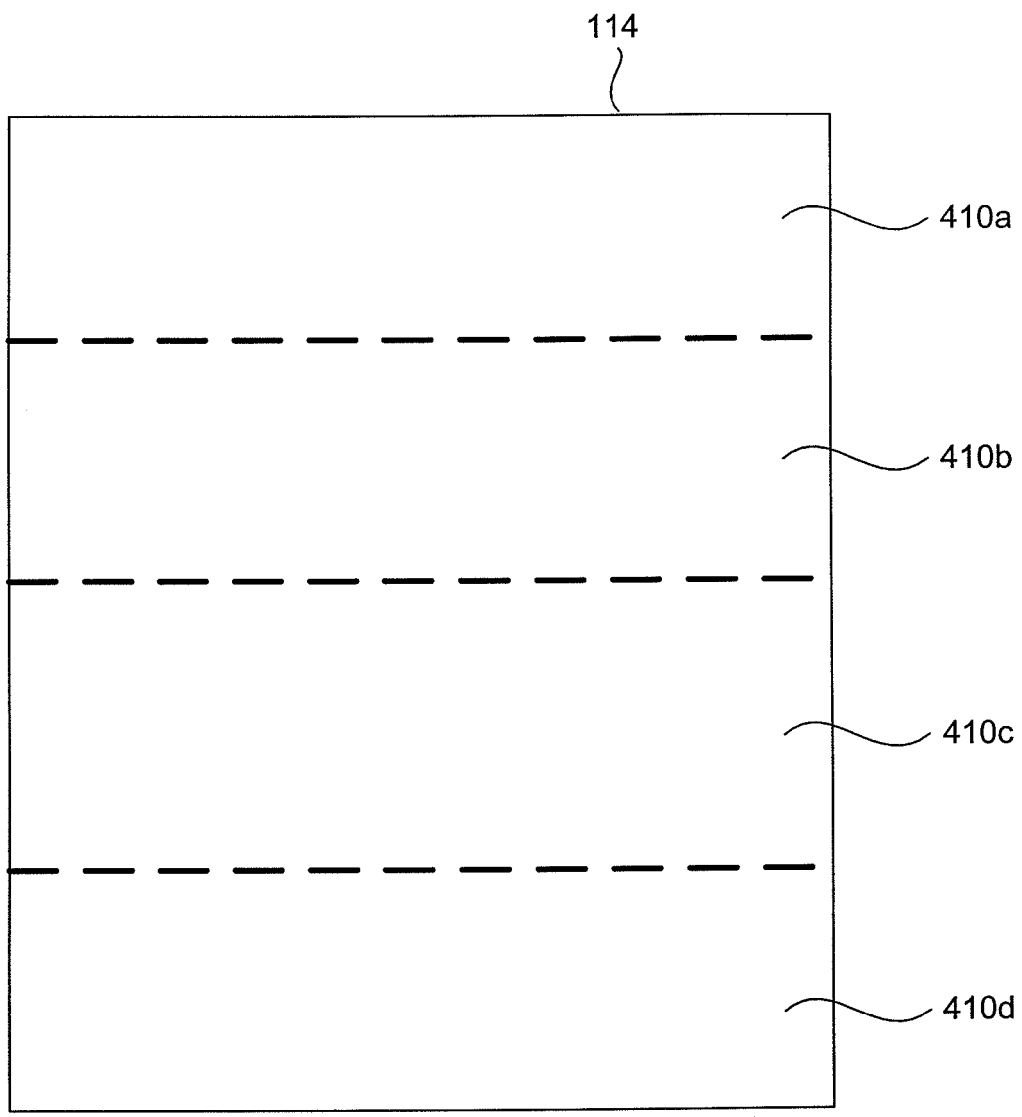
FIG. 4 is a diagram illustrating how the document may be partitioned into ROIs.

FIG. 4 is a diagram illustrating how the document 114 may be partitioned into ROIs 410. In the embodiment illustrated in FIG. 4, each ROI 410 is a rectangular section within a page of the document 114, which is also referred to as a band of the document 114. Four ROIs 410a-d are shown in FIG. 4.

Figure 5:
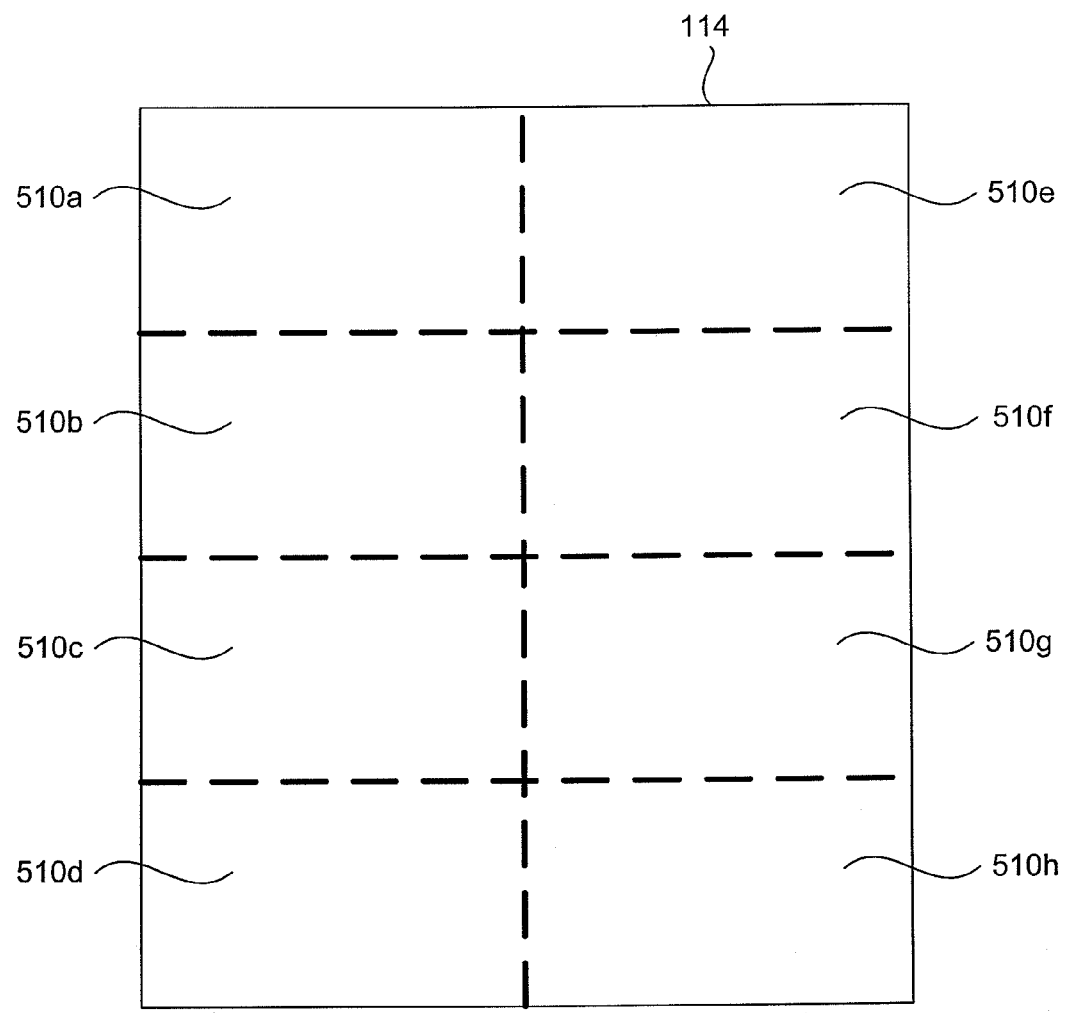
FIG. 5 is a diagram illustrating an alternative way in which the document may be partitioned into ROIs.

FIG. 5 is a diagram illustrating an alternative way in which the document 114 may be partitioned into ROIs 510. In the embodiment illustrated in FIG. 5, each ROI 510 is a portion of a band of the document 114. Eight ROIs 510*a-h* are shown in FIG. 5. Of course, as stated previously, an ROI 510 may be any part of the document 114 that is useful for processing, including multiple pages, a single page, a horizontal raster, a pixel, etc.

Figure 6:
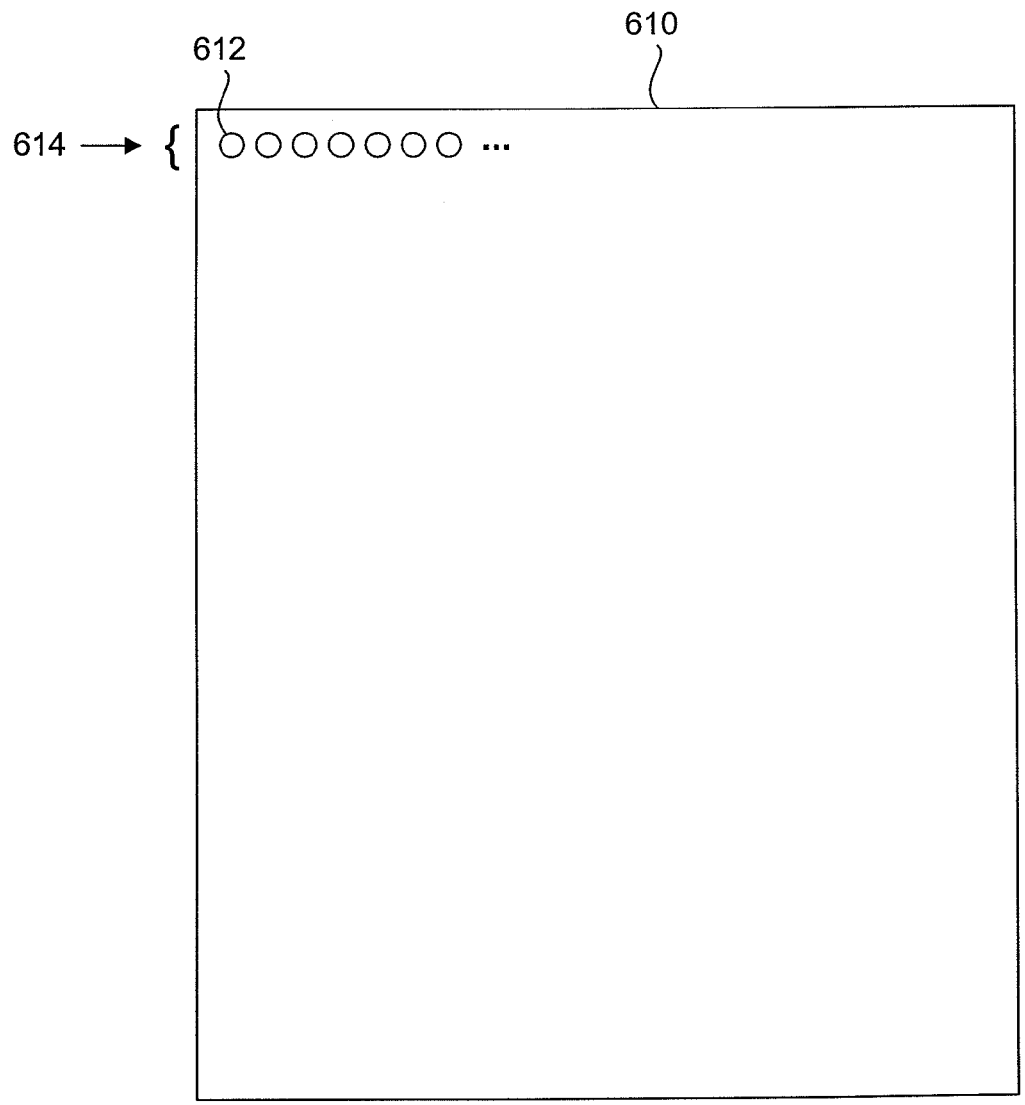
FIG. 6 is a diagram illustrating one way in which the printer may print the document on a piece of paper.

FIG. 6 is a diagram illustrating one way in which the printer 116 may print the document 114 on a piece of paper 610 or other material. Typically, the print commands 122 are ultimately represented on the piece of paper 610 as a series of pixels 612. The pixels 612 may be arranged in rows 614; typically it requires a plurality of rows 614 of pixels 612 to print an entire document 114.

Figure 7:
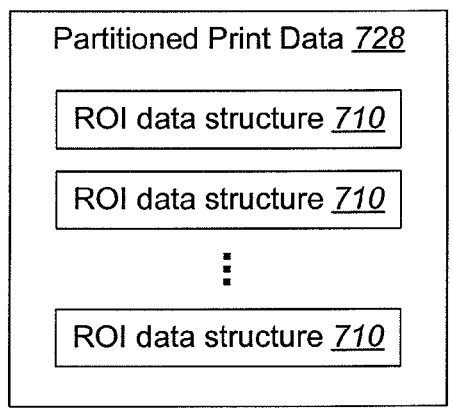
FIG. 7 is a block diagram illustrating an embodiment of the partitioned print data.

FIG. 7 is a block diagram illustrating an embodiment of the partitioned print data 728. As stated previously, the page assembler 126 receives the print commands 122 from the application 112 (or the GDI 210) and creates partitioned print data 728. The partitioned print data 728 includes a plurality of ROI data structures 710. Each ROI data structure 710 may include print data corresponding to a particular ROI 410 within the document 114. The print data may be pixel data, such as RGB pixel data. Each ROI data structure 710 may also include context data about a particular ROI 410. The context data may include information about how the print data corresponding to the ROI 410 should be processed. The ROI data structures 710 may be implemented as arrays, linked lists, tables, etc.

Figure 8:
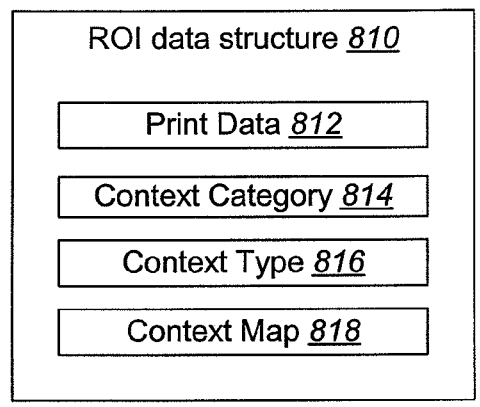
FIG. 8 is a block diagram illustrating an embodiment of an ROI data structure.

FIG. 8 is a block diagram illustrating an embodiment of an ROI data structure 810. The ROI data structure 810 may include print data 812 corresponding to an ROI 410 within the document 114. In one embodiment, the print data 812 includes pixel data, and in particular, RGB pixel data.

The ROI data structure 810 may also include context data. The context data may include a context category 814. In one embodiment, the context category 814 may be either homogeneous or heterogeneous. If the context category 814 is homogeneous, this means that all of the print data 812 within the ROI data structure 810 is of the same type. In contrast, if the context category 814 is homogeneous, this means that not all of the print data 812 within the ROI data structure 810 is of the same type.

For example, the context category 814 may be homogeneous if the print data 812 within the ROI data structure 810 includes only color pixels. Similarly, the context category 814 may be homogeneous if the print data 812 within the ROI data structure 810 includes only black-and-white pixels. In contrast, the context category 814 may be heterogeneous if the print data 812 within the ROI data structure 810 includes both color pixels and black-and-white pixels.

If the context category 814 is homogeneous, the ROI data structure 810 may include a context type 816. The context type 816 may describe the print data 812. In one embodiment, the context type 816 may be one of three values: color, black-and-white, or blank. In such an embodiment, if the context type 816 is color, this may indicate that the print data 812 includes only color pixels. If the context type 816 is black-and-white, this may indicate that the print data 812 includes only black-and-white pixels. If the context type 816 is blank, this may indicate that the print data 812 does not include any pixels.

In another embodiment, the context type 816 may be one of five values: color image, color non-image, black-and-white image, black-and-white non-image, or blank. As used herein, an image refers to picture data, whereas a non-image refers to computer-generated data (e.g., text, line art, etc.). In such an embodiment, if the context type 816 is color image, this means that the print data 812 only includes pixels corresponding to a color image. If the context type 816 is color non-image, this means that the print data 812 only includes pixels corresponding to a color non-image. If the context type 816 is black-and-white image, this means that the print data 812 only includes pixels corresponding to a black-and-white image. If the context type 816 is black-and-white non-image, this means that the print data 812 only includes pixels corresponding to a black-and-white non-image. If the context type 816 is blank, this may indicate that the print data 812 does not include any pixels.

Of course, the context types 816 listed above are exemplary only. Those skilled in the art will recognize numerous additional context types 816 that may be used with embodiments disclosed herein.

If the context category 814 is heterogeneous, the ROI data structure 810 may include a context map 816. As stated previously, the print data 812 may include pixel data. The context map 816 may include context data about each pixel within the print data.

Figure 9:
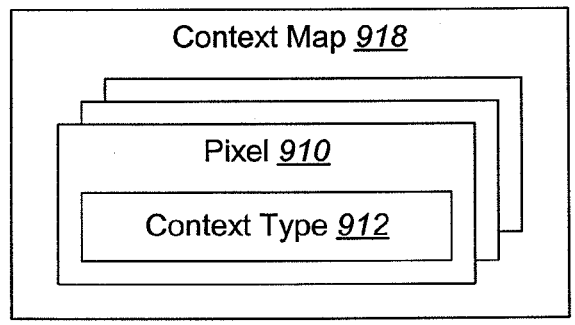
FIG. 9 is a block diagram illustrating an embodiment of a context map.

FIG. 9 is a block diagram illustrating an embodiment of a context map 918. The context map 918 may include a plurality of pixels 910. A context type 916 may be associated with each pixel 910. The context type 916 may be similar to the context type 816 in the ROI data structure 810 described previously, except that the context type 916 shown in FIG. 9 is associated with single pixel 910, as opposed to an entire ROI 410.

Figure 10:
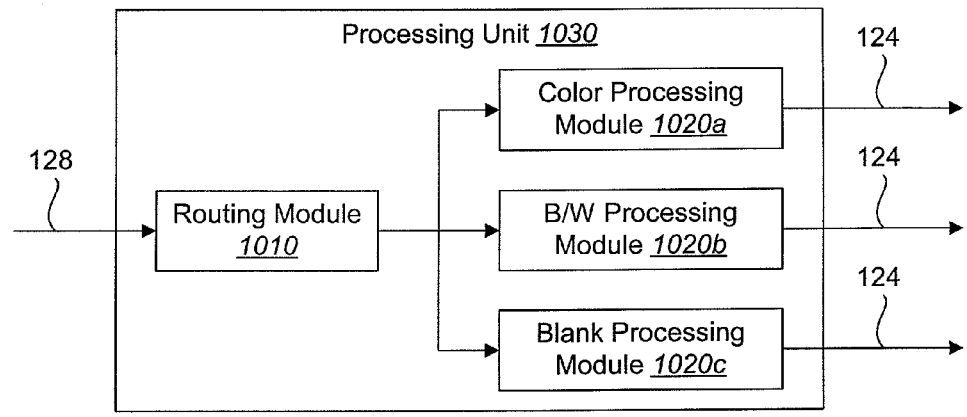
FIG. 10 is a block diagram illustrating an embodiment of the processing unit.

FIG. 10 is a block diagram illustrating an embodiment of the processing unit 1030. The processing unit 1030 may include a routing module 1010. The routing module 1010 receives the partitioned print data 128 from the page assembler 126 and, based on the context data within the partitioned print data 128, decides where to send the partitioned print data 128.

The processing unit 1030 may include a plurality of processing modules 1020. In the embodiment shown in FIG. 10, three processing modules 1020 are included: a color processing module 1020*a*, a black-and-white processing module 1020*b*, and a blank processing module 1020*c*. The color processing module 1020*a* is capable of processing print data 812 that includes color pixels. The black-and-white processing module 1020*b* is capable of processing print data 812 that includes black-and-white pixels. The blank processing module 1020*c* is capable of processing print data 812 that does not include any pixels. Those skilled in the art will recognize many different ways to implement the color processing module 1020*a*, black-and-white processing module 1020*b*, and blank processing module 1020*c* in light of the teachings contained herein.

As stated previously, the partitioned print data 128 may include one or more ROI data structures 810, and each ROI data structure 810 may include print data 812 corresponding to a ROI 410. The routing module 1010 may decide how to process the print data 812 within each ROI data structure 810 based on the context data within each ROI data structure 810. For example, if the routing module 1010 determines that the print data 812 within an ROI data structure 810 includes only color pixels (e.g., by examining the context category 814 and context type 816 within the ROI data structure 810), the routing module 1010 may send the print data 812 within the ROI data structure 810 to the color processing module 1020*a*. If the routing module 1010 determines that the print data 812 within an ROI data structure 810 includes only black-and-white pixels, the routing module 1010 may send the print data 812 within the ROI data structure 810 to the black-and-white processing module 1020*b*. If the routing module 1010 determines that the print data 812 within an ROI data structure 810 does not include any pixels, the routing module 1010 may send the ROI data structure 810 to the blank processing module 1020c.

If the routing module 1010 determines that the print data 812 within an ROI data structure 810 includes both color and black-and-white pixels, the routing module 1010 may send a portion of the print data 812 within the ROI data structure 810 to the color processing module 1020a, and another portion of the print data 812 within the ROI data structure 810 to the black-and-white processing module 1020b. The routing module 1010 may determine which portion of the print data 812 to send to the color processing module 1020a and which portion to send to the black-and-white processing module 1020b by reference to the context map 818.

In one embodiment, the routing module 1010 may take several stages to decide how the print data 812 within the ROI data structures 810 should be processed. In particular, the routing module 1010 may look for print data 812 of a first context type 818 during a first stage, print data 812 of a second context type 818 during a second stage, and so on. For example, the routing module 1010 may send color pixels within the print data 812 to the color processing module 1020a during a first stage, black-and-white pixels within the print data 812 to the black-and-white processing module 1020b during a second stage, and so forth.

The number of processing modules 1020 illustrated in FIG. 10 is exemplary only. Those skilled in the art will recognize that any number of processing modules 1020 may be included within the processing unit 1030.

Figure 11:
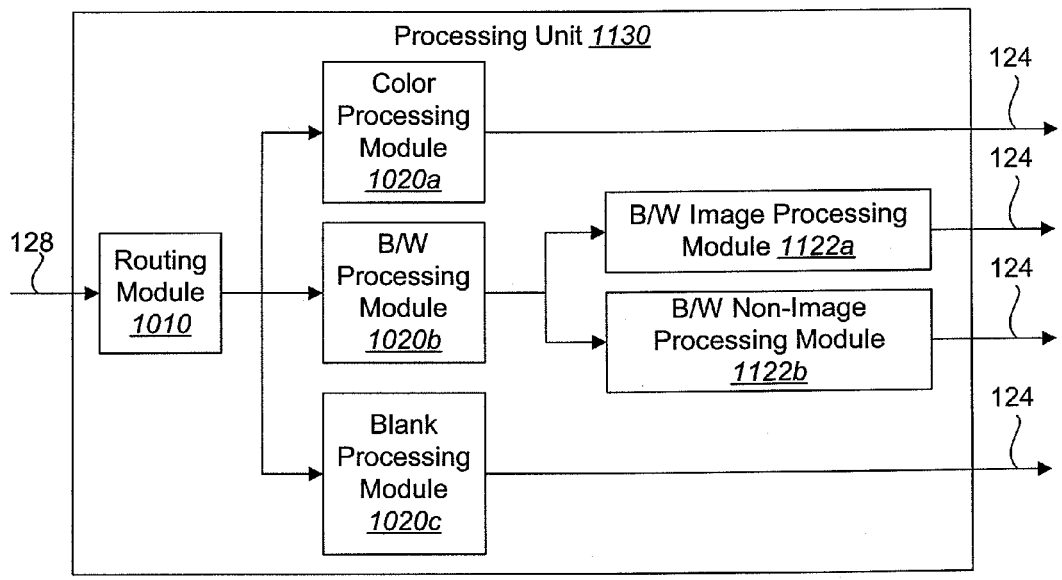
FIG. 11 is a block diagram illustrating an alternative embodiment of the processing unit.

FIG. 11 is a block diagram illustrating an alternative embodiment of the processing unit 11130. The embodiment of the processing unit 1130 shown in FIG. 11 includes a black-and-white image processing module 1122a and a black-and-white non-image processing module 1122b. Once the print data 812 (or a portion thereof) within an ROI data structure 810 is sent to the black-and-white processing module 1120b, the black-and-white processing module 1120b may determine whether the print data 812 includes pixels corresponding to a black-and-white image and/or a black-and-white non-image. Pixels that correspond to a black-and-white image may be sent to the black-and-white image processing module 1122a, while pixels corresponding to a black-and-white non-image may be sent to the black-and-white non-image processing module 1122b.

Figure 12:
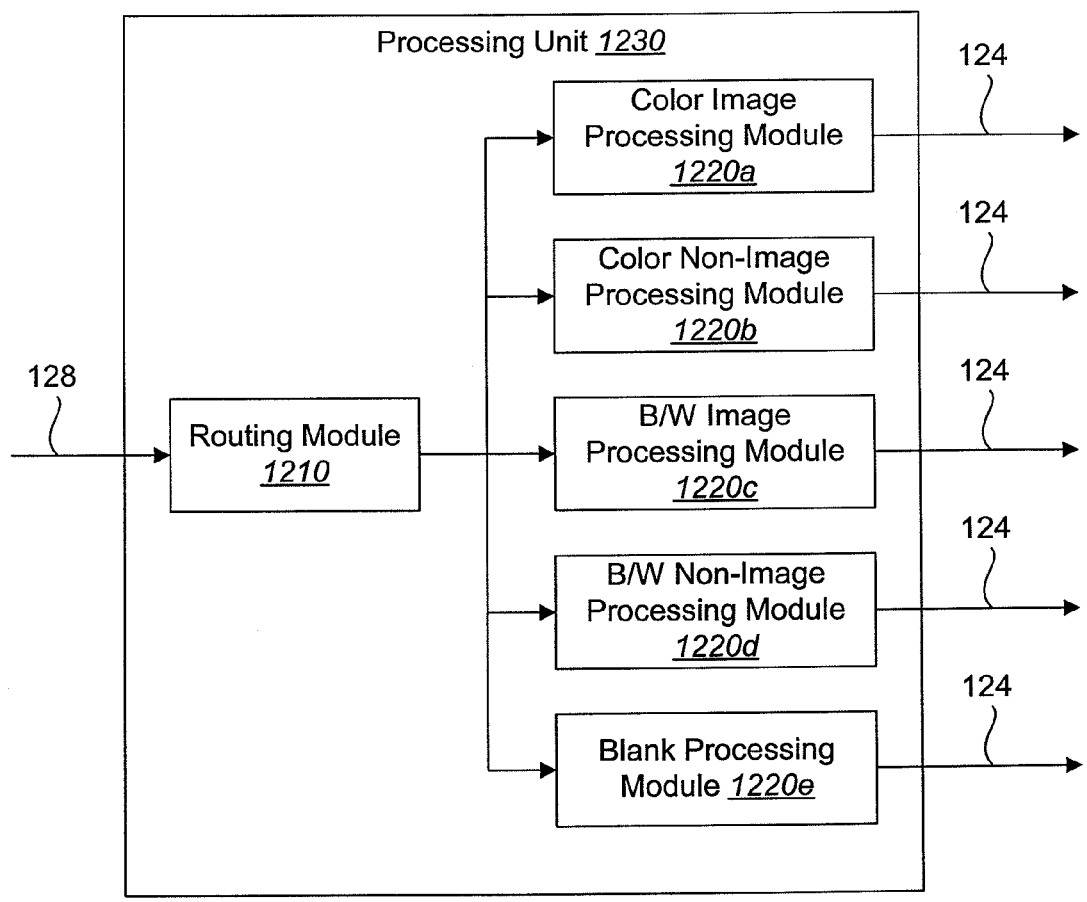
FIG. 12 is a block diagram illustrating an alternative embodiment of the processing unit.

FIG. 12 is a block diagram illustrating an alternative embodiment of the processing unit 1230. In the embodiment shown in FIG. 12, five processing modules 1220 are included: a color image processing module 1220a, a color non-image processing module 1220b, a black-and-white image processing module 1220c, a black-and-white non-image processing module 1220d, and a blank processing module 1220e. The color image processing module 1220a is capable of processing print data 812 that includes color pixels that correspond to color images. The color non-image processing module 1220b is capable of processing print data 812 that includes color pixels that correspond to color non-images. The black-and-white image processing module 1220c is capable of processing print data 812 that includes black-and-white pixels that correspond to black-and-white images. The black-and-white non-image processing module 1220d is capable of processing print data 812 that includes black-and-white pixels that correspond to black-and-white non-images. The blank processing module 1220e is capable of processing print data 812 that does not include any pixels. Those skilled in the art will recognize many different ways to implement the color image processing module 1220a, color non-image processing module 1220b, black-and-white image processing module 1220c, black-and-white non-image processing module 1220d, and blank processing module 1220e in light of the teachings contained herein.

Figure 13:
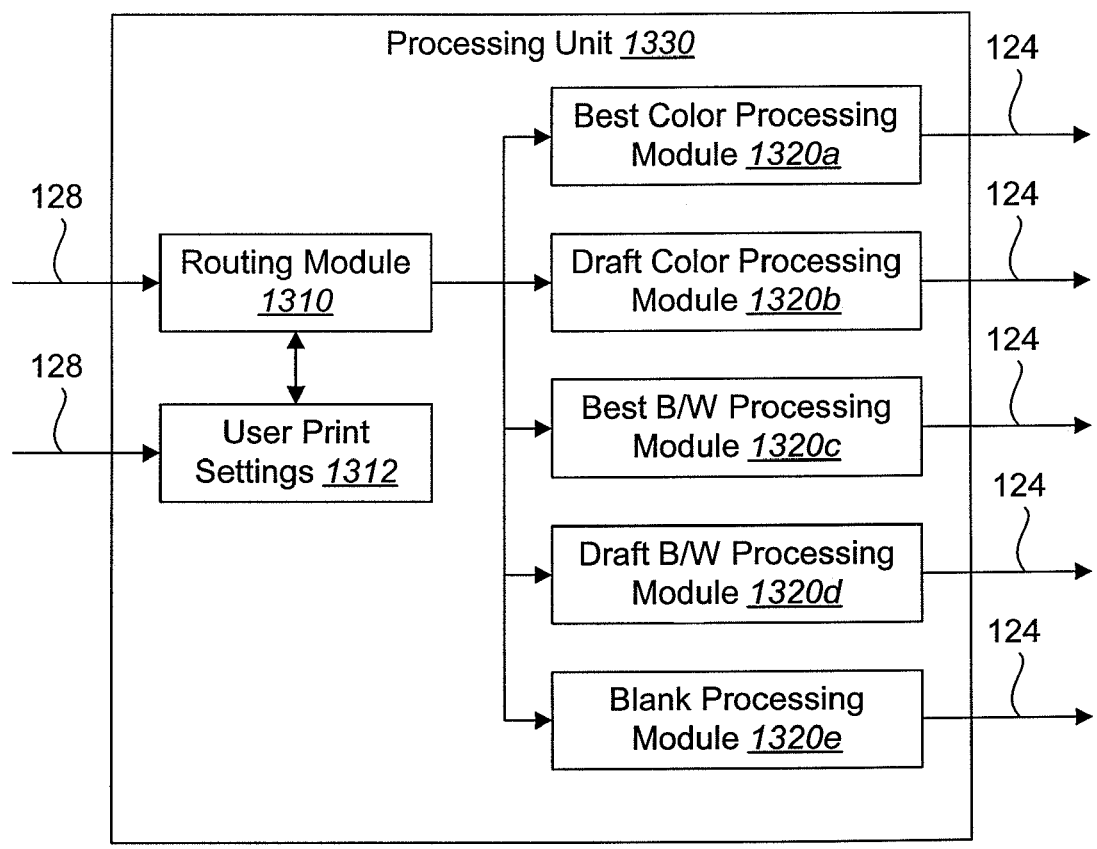
FIG. 13 is a block diagram illustrating another alternative embodiment of the processing unit.

In some embodiments, print data 812 generated by the application 112 (or by the GDI 210) may include user print settings 1312. User print settings 1312 describe the level of quality at which a document 114 is printed. Examples of user print settings 1312 include best, intermediate, draft, etc. FIG. 13 is a block diagram illustrating another alternative embodiment of the processing unit 1330. In the embodiment illustrated in FIG. 13, the processing unit 1330 receives the user print settings 1312 as part of the partitioned print data 128 sent from the page assembler 126. Alternatively, the processing unit 1330 may receive the user print settings 1312 directly from the application 112, GDI 210, etc.

The routing module includes five processing modules 1320: a best color processing module 1320a, a draft color processing module 1320b, a best black-and-white processing module 1320c, a draft black-and-white processing module 1320d, and a blank processing module 1320e. The best color processing module 1320a is capable of processing print data 812 that includes color pixels at a higher level of quality than the draft color processing module 1320b. Similarly, the best black-and-white processing module 1320c is capable of processing print data 812 that includes black-and-white pixels at a higher level of quality than the draft black-and-white processing module 1320d. Of course, the number of processing modules 1320 illustrated in FIG. 13 is exemplary only.

The routing module 1310 may take into consideration the user print settings 1312 when determining how to process the partitioned print data 128. For example, suppose the routing module 1310 determines that the print data 812 within an ROI data structure 810 includes only color pixels. If the user has specified that documents 114 should be printed at the best level of quality, then the routing module 1310 may send the print data 812 within the ROI data structure 810 to the best color processing module 1320a. Conversely, if the user has specified that documents 114 should be printed at the draft level of quality, then the routing module 1310 may send the print data 812 within the ROI data structure 810 to the draft color processing module 1320a.

Figure 14:
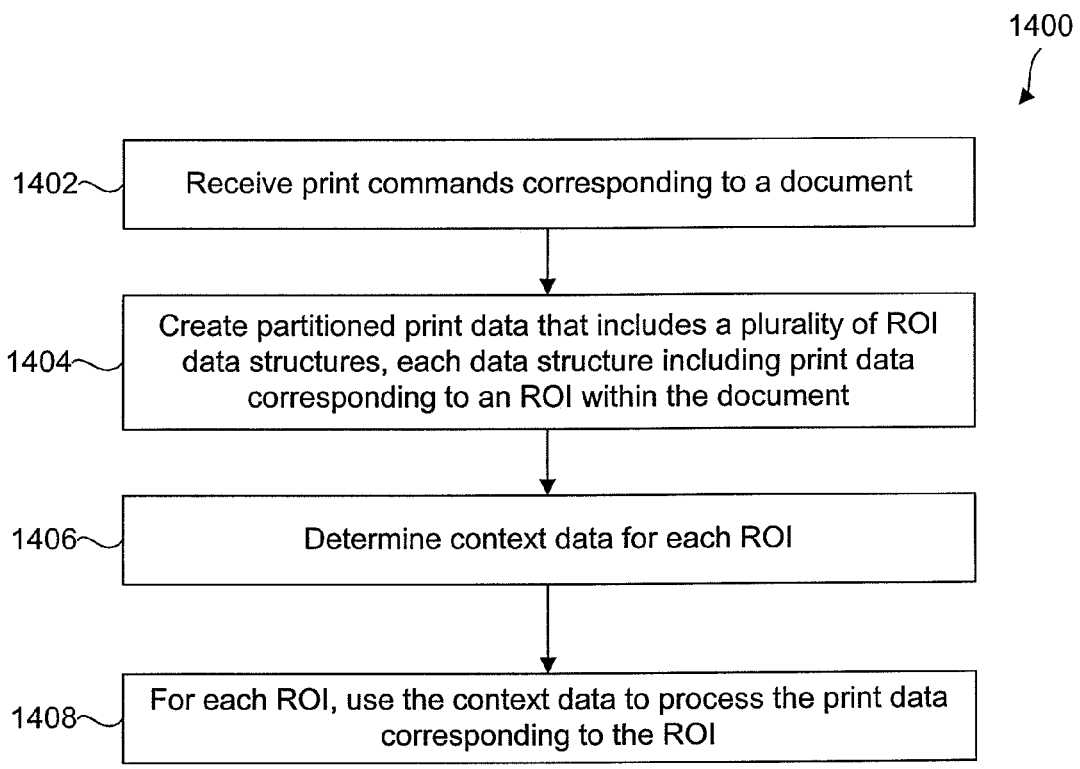
FIG. 14 is a flow diagram illustrating a method for context-based processing of print data.

FIG. 14 is a flow diagram illustrating a method 1400 for context-based processing of print data 812. The method 1400 begins when the printer driver 120 receives 1402 print commands 122 corresponding to a document 114. The method 1400 may then involve creating 1404 partitioned print data 128. The partitioned print data 128 may include a plurality of ROI data structures 810 that include print data 812 corresponding to ROIs 410 within the document 114. The method 1400 may then involve determining context data for each ROI 410. Determining context data for an ROI may involve determining a context category 814, determining a context type 816, and/or creating a context map 816 for an ROI 410. For each ROI 410, the context data may then be used 1408 to determine how the print data 812 corresponding to the ROI 410 is processed.

Figure 15:
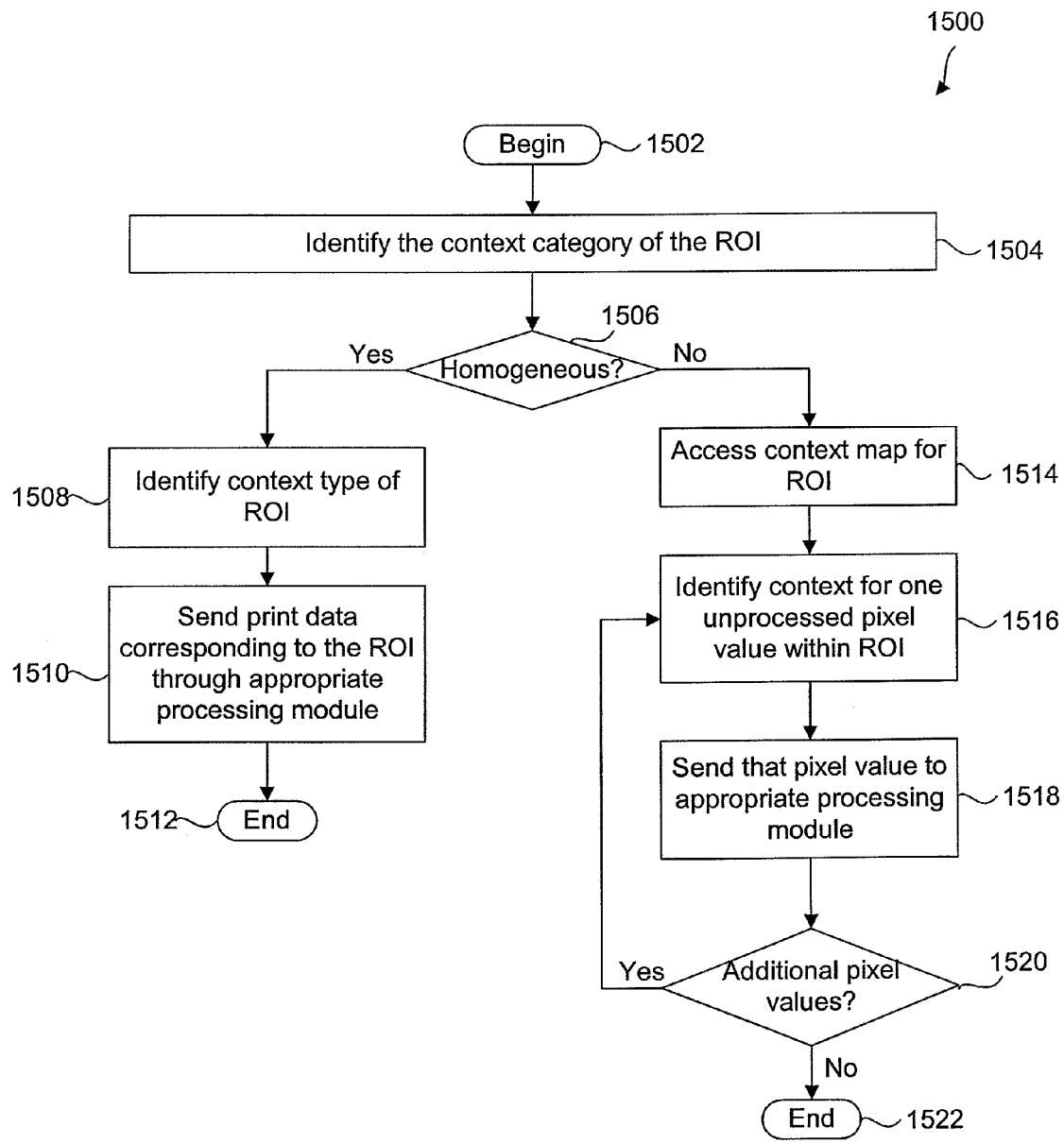
FIG. 15 is a flow diagram illustrating a method for using context data to determine how the print data corresponding to an ROI is processed.

FIG. 15 is a flow diagram illustrating a method 1500 for using context data to determine how the print data 812 corresponding to an ROI 410 is processed. The method 1500 begins 1502 by identifying 1504 the context category 814 for the print data 812 corresponding to an ROI 410. If the context category is homogeneous, then the context type 816 of the print data 812 corresponding to the ROI 410 is identified 1508. Based on this information, the print data 812 is then sent 1510 to the appropriate processing module 1120.

If in step 1506 it is determined that the context category 814 is heterogeneous, then the context map 816 for the ROI 410 may be accessed 1514. The context type 916 for one unprocessed pixel 910 within the print data 812 is then identified 1516. That pixel 910 is then sent 1518 to the appropriate processing module 1120. For example, if the pixel 910 is a black-and-white pixel, then that pixel 910 may be sent to the black-and-white processing module 1120b. Conversely, if the pixel 910 is a color pixel, then that pixel 910 may be sent to the color processing module 1120a. It is then determined 1520 whether there are additional unprocessed pixels 910 in the print data 812 corresponding to the ROI 410. If so, the method 1500 returns to step 1516 and continues as described above. If not, the method 1500 ends 1522.

Those of skill in the art would understand that the various illustrative logical blocks, modules, and algorithm steps described in connection with the embodiments disclosed herein may be implemented as computer software, electronic hardware, or combinations of both. To clearly illustrate this interchangeability of hardware and software, various illustrative components, blocks, modules, and steps have been described above generally in terms of their functionality. Whether such functionality is implemented as software or hardware depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for context-based processing of print data, the method being implemented by a printer driver, the method comprising:
   partitioning a document to be printed into a plurality of regions of interest;
   for each region of interest:
       determining context data that comprises information about how print data corresponding to a region of interest should be processed, wherein the print data comprises print commands, and wherein processing the print data comprises converting the print commands into printer-ready data; and
       using the context data for the region of interest to select at least one processing module for processing the print data corresponding to the region of interest.

2. The method of claim 1, wherein determining context data comprises:
   determining whether the print data corresponding to the region of interest includes black-and-white pixels; and
   determining whether the print data corresponding to the region of interest includes color pixels.

3. The method of claim 1, further comprising:
   accessing user print settings for the document to be printed; and
   for each region of interest, using the user print settings in addition to the context data to select the at least one processing module.

4. A printer driver for context-based processing of print data, comprising:
   one or more modules that are configured to:
       partition a document to be printed into a plurality of regions of interest; and
       for each region of interest:
           determine context data that comprises information about how print data corresponding to a region of interest should be processed wherein the print data comprises print commands, and wherein processing the print data comprises converting the print commands into printer-ready data; and
           use the context data for the region of interest to select at least one processing module for processing the print data corresponding to the region of interest.

5. The printer driver of claim 4, wherein determining context data comprises:
   determining whether the print data corresponding to the region of interest includes black-and-white pixels and
   determining whether the print data corresponding to the region of interest includes color pixels.

6. The printer driver of claim 4, wherein the one or more modules are further configured to:
   access user print settings for the document to be printed; and
   for each region of interest, use the user print settings in addition to the context data to select the at least one processing module.

7. A computer-readable medium comprising executable instructions for context-based processing of print data, the instructions being executable by a printer driver to:
   partition a document to be printed into a plurality of regions of interest; and for each region of interest:
       determine context data that comprises information about how print data corresponding to a region of interest should be processed, wherein the print data comprises print commands, and wherein processing the print data comprises converting the print commands into printer-ready data; and
       use the context data for the region of interest to select at least one processing module for processing the print data corresponding to the region of interest.

8. The computer-readable medium of claim 7, wherein determining context data comprises:
   determining whether the print data corresponding to the region of interest includes black-and-white pixels; and
   determining whether the print data corresponding to the region of interest includes color pixels.

9. The computer-readable medium of claim 7, wherein the instructions are further executable to:
   access user print settings for the document to be printed; and
   for each region of interest, use the print settings in addition to the context data to select the at least one processing module.

* * * * *

UNITED STATES PATENT AND TRADEMARK OFFICE
CERTIFICATE OF CORRECTION

| | | |
|---|---|---|
| PATENT NO. | : 7,453,603 B2 | Page 1 of 1 |
| APPLICATION NO. | : 11/688750 | |
| DATED | : November 18, 2008 | |
| INVENTOR(S) | : Gregory E. Borchers et al. | |

It is certified that error appears in the above-identified patent and that said Letters Patent is hereby corrected as shown below:

In Column 7, line 31 please replace "11130" with --1130--.

Signed and Sealed this

Twenty-first Day of April, 2009

JOHN DOLL
*Acting Director of the United States Patent and Trademark Office*